Figure 1:
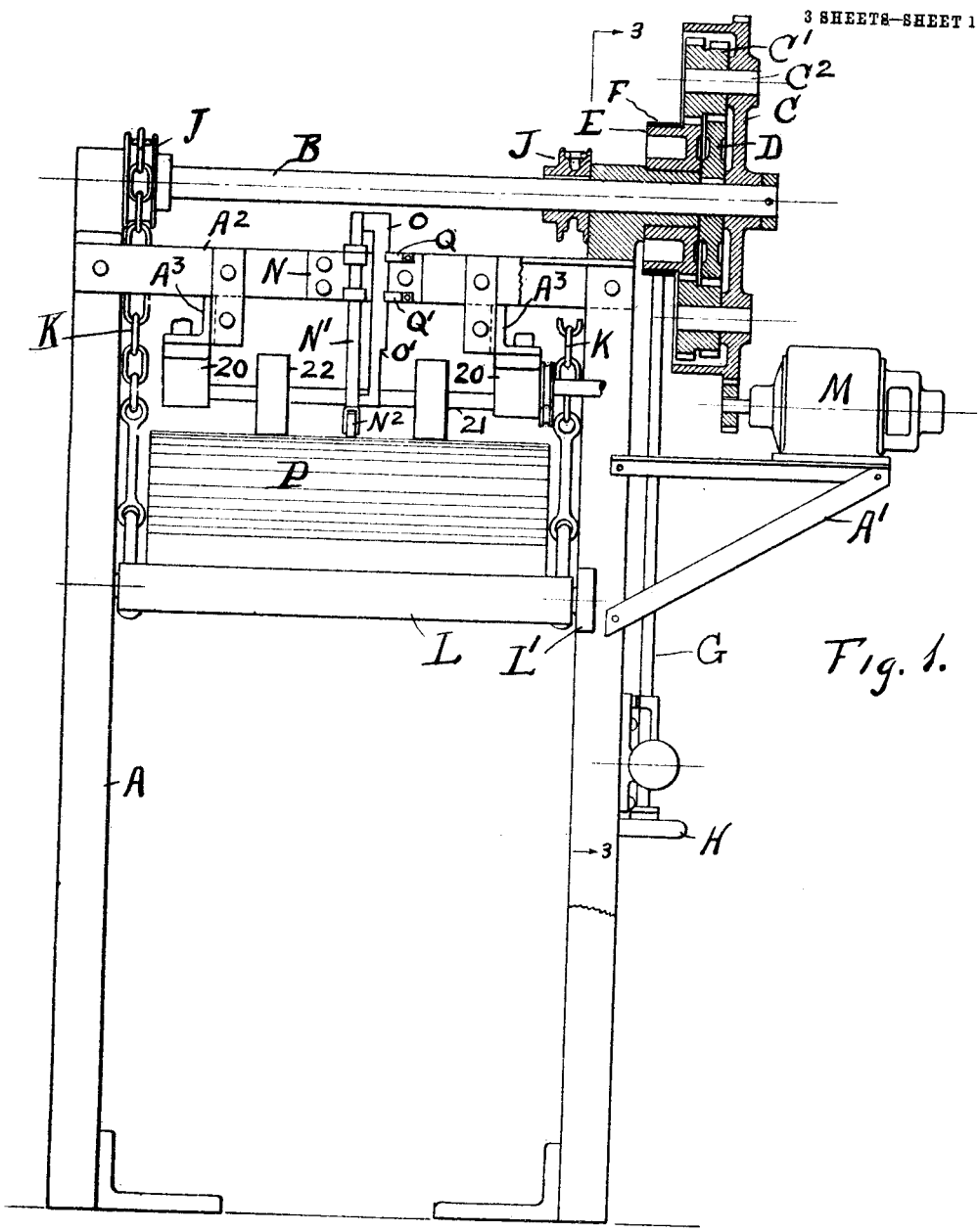

C. E. STEERE.
PAPER LIFTING DEVICE.
APPLICATION FILED FEB. 15, 1909.

1,065,085.

Patented June 17, 1913.
3 SHEETS—SHEET 1.

Witness:
Mona L. Steere
Ernst Tronvig

Inventor
Clarence E. Steere
By Casper L. Redfield
Attorney

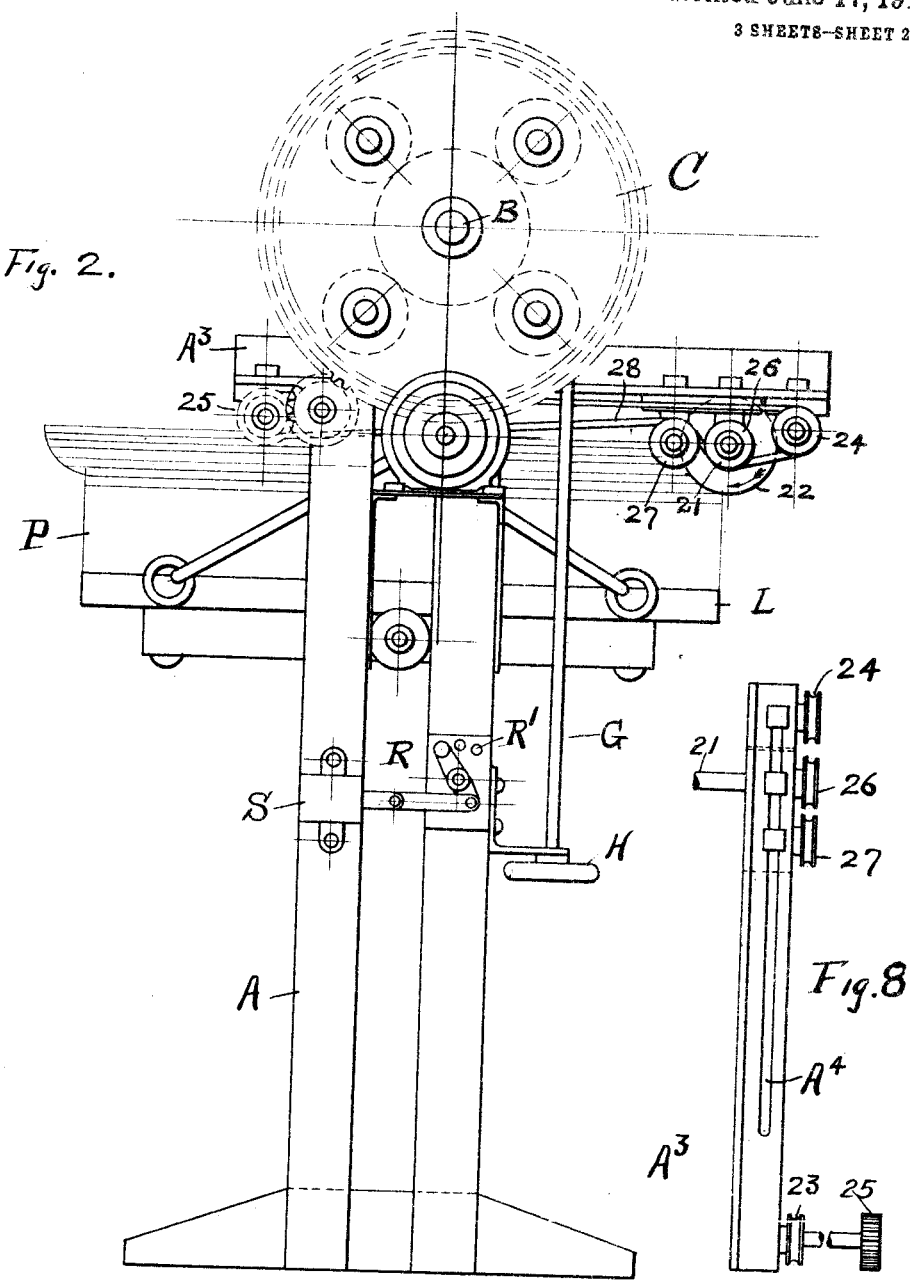

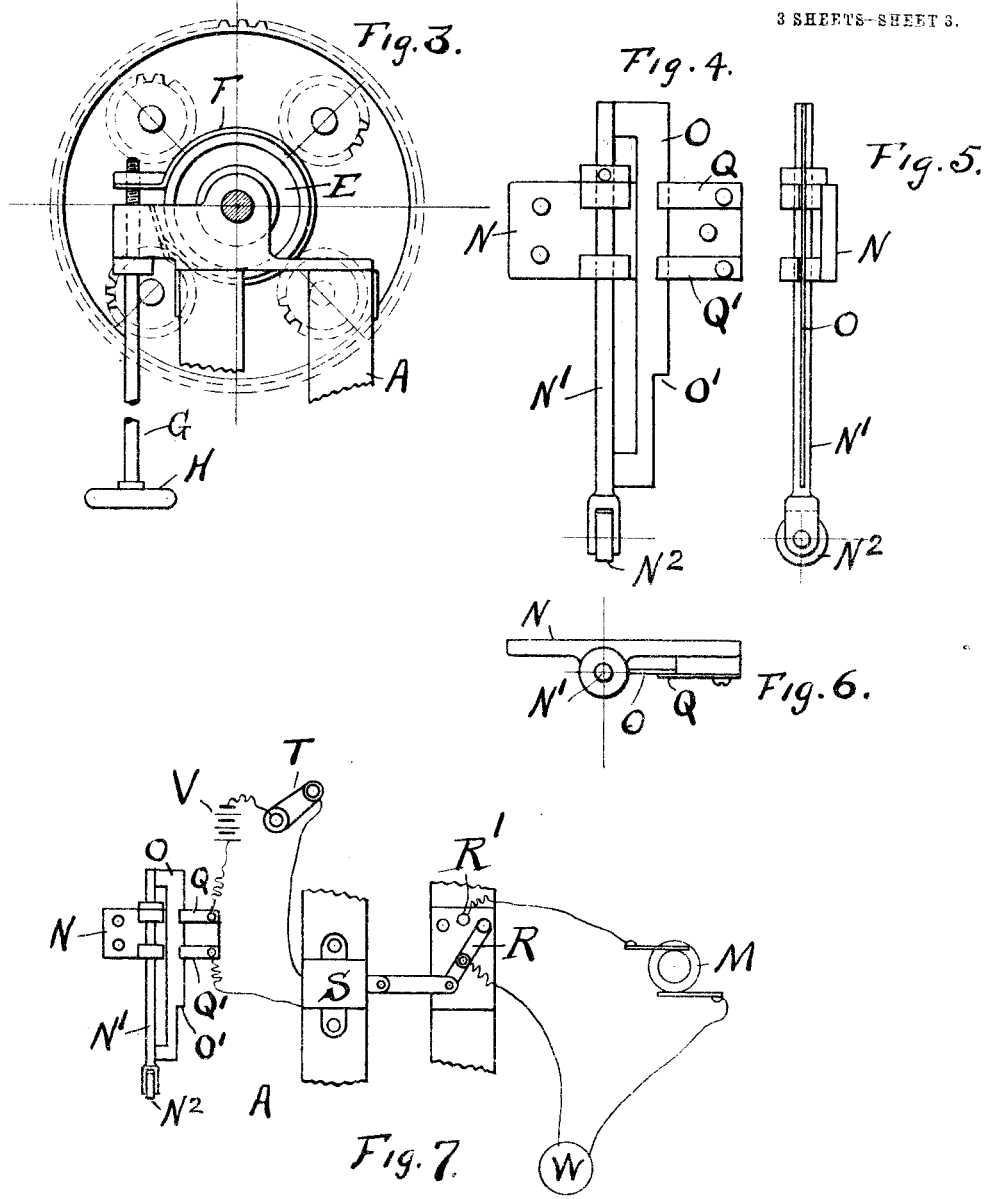

UNITED STATES PATENT OFFICE.

CARL WOLFERMANN, OF NEW YORK, N. Y.

FOLDING TOP FOR VEHICLES.

1,065,092.  Specification of Letters Patent.  Patented June 17, 1913.

Application filed August 7, 1912. Serial No. 713,788.

*To all whom it may concern:*

Be it known that I, CARL WOLFERMANN, a subject of the Emperor of Germany, and resident of the borough of Manhattan, city, county, and State of New York, have invented certain new and useful Improvements in Folding Tops for Vehicles, of which the following is a specification.

My invention relates to folding tops for vehicles and more particularly for automobiles and has for its object to improve and simplify the construction thereof and to provide a top which may be readily folded into a compact condition when desired and which at any time may be easily brought to an unfolded and operative position to cover the vehicle.

A further object of my improvement is to construct the top so that in its operative or unfolded position it will extend over substantially the entire body of the vehicle without interfering with the ingress to or egress therefrom and will be rigidly supported in said operative or unfolded condition.

My invention further contemplates constructing the top in such a manner that any shrinkage or stretching of the material forming part of the top will be automatically compensated for so that the extended position of the top will always be substantially the same and sagging or other disarrangement thereof will be prevented.

Other objects of my improvement will be fully disclosed hereinafter and the features of novelty will be pointed out in the appended claims.

Reference is to be had to the accompanying drawings in which—

Figure 1 is a side elevation of a portion of an automobile with my improved top applied thereto and showing said top in its operative or extended position, the covering material being shown in section and Fig. 2 is a similar view showing the top in its folded or inoperative position.

In the drawings 1 represents a portion of the body of a vehicle of any suitable description, as for instance an automobile for carrying passengers, which in this case is provided with front doors 2 and rear doors 3 in the usual manner. As illustrated my improved top comprises a main or rear section consisting of a main bow 4 arched over the body when the top is extended or unfolded and having its opposite free ends pivotally connected with said body at 5, the said pivots 5 being preferably located at points between the rear doors 3 and the rear end of the vehicle. The said main or rear section further comprises additional bows 6 and 7 pivotally connected with the main bow 4 at 8 and 9 respectively, and extending rearwardly therefrom in the unfolded position of the top, the bow 6 being somewhat longer than the bow 7 as shown best in Fig. 1. A cover 10 of fabric or any suitable material, preferably waterproof, is attached to the bows 4, 6 and 7 so as to extend over the free ends thereof and has its one free edge suitably secured to the vehicle body at the rear end thereof, it being understood that said cover also preferably extends downwardly over the sides of said bows in any customary manner. When in its unfolded or extended condition as shown in Fig. 1 the main or rear section of the top covers the rear end of the vehicle and forms a hood thereover. In order to also protect the forward or front portion of the vehicle I construct the top with an auxiliary or front section which consists of rods 11 pivotally secured at 12 to the opposite side members of the main bow 4 and in turn have their free ends pivotally connected at 13 with the free ends of a front bow 14 which extends in a substantially horizontal plane over the front portion of the body when the top is in its extended position. The rods 11 and bow 14 are of such dimensions as to extend substantially to a point over the front end of the body in the operative position of the top as is clearly illustrated in Fig. 1 and the cover 10 is extended beyond the bow 4 and is secured to the bow 14 at the front so as to form a projecting hood over the front portion of the body. An additional bow 15 has its opposite free ends pivotally connected at 16 with the rods 11 and is also secured to the cover 10 for supporting same at a point between the bows 4 and 14 when in an extended position. In order to rigidly maintain the auxiliary section in operative or extended position and to prevent breaking of the joints at the pivots 13 I provide links 17 and 18 which have one end pivotally connected at 19 and 20 with the side members of the bow 14 and the rods 11 respectively and their opposite ends pivotally connected at 21 with the one end of braces 22. These braces 22 are each pivotally connected at 23 with the sides of the main bow 4, the said pivots 23 being located at points intermediate of the ends of the braces 22, and preferably nearer to the rear ends thereof. These rear ends of said braces 22 are in turn pivotally secured at 22ª to the one end of links 24 the opposite ends of which are pivotally attached at 25 to projections or lugs 26 rigidly secured to the side members of the additional bow 6 as shown best in Fig. 1. It will thus be seen that with this construction the links 17 and 18 extend from the braces 22 to the bow 14 and rods 11 to opposite sides of the pivots 13 and owing to the fact that the braces 22 are rigidly held against a rocking movement about the pivots 23 by means of the links 24 serve to prevent any swinging movement of the bow 14 about the pivots 13 and any pivotal movement of the rods 11 about the pivots 12 so that a breaking of the joints between said bow 14 and the rods 11 is absolutely prevented. At the same time it will be noted that the pivots 13 are located about midway between the front end of the bow 14 and the rear ends of the rods 11 and that the connections between said bow 14 and rods 11 with the braces 22 are similarly located, the braces 22 being long enough to provide for this arrangement. Thus the auxiliary section which forms a hood over the front portion of the vehicle is suspended from substantially central points and is consequently rigidly and firmly supported without the necessity for any braces from said auxiliary section to the body of the car.

It is, of course, to be understood that the rear portion of the cover 10 which extends from the rear end of the vehicle to the bow 6 will counteract or resist any tendency of the said bow 6 or the main bow 4 to swing on their respective pivots toward the front of the vehicle when the auxiliary section is in its extended position and that the links 17 and 18, the braces 22 and the links 24 consequently comprise a secure means for rigidly supporting said auxiliary section of the top in operative position.

If through atmospheric or other conditions the cover 10 should stretch, and tend to sag this tendency would be overcome in the following manner without permitting the auxiliary section of the top to drop or sag. Any stretching of that portion of the cover 10 located between the main bow 4 and the rear end of the vehicle will allow the main bow to swing downwardly toward the front end of the vehicle and will thus move the pivots 23 in the arc of a circle in the same direction. This action would cause a downward pull to be exerted on the links 24 which movement will be communicated to the braces 22 and will swing them about their pivots 23 in a direction to raise the front upper ends of said braces 22 and consequently lift the bow 14 and rods 11 and with them the entire auxiliary section and thus overcome the dropping or sagging movement thereof occasioned by the forward swinging of the main bow 4. It will be understood that owing to the fact that the projections or lugs 26 are located in close proximity to the pivots 8 of the bows 6 that these points are substantially stationary and will not be materially affected by any movement of said bows 6 brought about by the stretching of the cover 10. Similarly on account of being located close to the pivots 5 the said lugs will be unaffected to any material degree by a movement of the bow 4 as described. The said links 17 and 18, braces 22 and links 24 thus in addition to acting as supports for the auxiliary section of the top also serve to act as a means for compensating for any stretch or sag of the cover in the main section of said top. If a stretching occurs in that portion of the cover located between the bows 4 and 14 this will be taken up by the bow 15 which will simply swing on its pivots 16 and maintain this portion of said cover in a taut condition. If the cover 10 shrinks from any cause a reverse action of the parts from that described will take place so that no matter what physical changes may take place in the cover the auxiliary section of the top will always be in substantially the same position when in its extended condition. It will be seen that with my improved construction there are no braces to interfere with ingress to or egress from the body of the vehicle through the doors 2 and 3 and that the vision of the occupants is not obstructed while all parts of the vehicle occupied by said occupants is completely protected.

It is, of course, to be understood that the usual straps or other stays 27 extending from the front of the top to the body to secure the said top against accidental collapse for instance through the force exerted by the wind may be utilized in the usual manner if desired. When the top is to be folded out of the way these straps or stays 27, if used, are first disconnected after which the main bow 4 is swung downwardly toward the rear on its pivots 5, and the additional bows 6 and 7 swung on their pivots 8 and 9 in a direction toward the main bow so that these additional bows 6 and 7 in their folded condition lay against and beneath the said main bow 4 as shown in Fig. 2. This rearward and downward movement of the main bow 4 and the swinging movement of the bow 6 toward said bow 4 will cause a pushing action to be exerted on the links 24 and consequently swing the braces 22 on their pivots 23 in a direction to cause the forward ends thereof to swing downwardly and toward the bow 4. This operation will thus also cause the rods 11 to swing on their while the power is raising the platform, and means for releasing the brake so as to permit the last named gear to turn.

2. The combination with a platform, and a source of power for raising it, of a connection between the power and the platform consisting of a planetary gearing having movable central and revolving gears, and a brake associated with one of the central gears and provided with means by which such bear may be held stationary or be permitted to slip.

3. A detached and independently movable frame, a platform supported in and guided by said frame and upon which paper may be piled, a motor carried on said frame, connections from said motor to said platform for raising the latter, a planetary gearing involving a fixed and a movable gear in said connections and forming a part thereof, a shaft secured to the movable gear and forming another part of said connection, a brake by which the fixed gear is held in position, and means by which said brake may be released to permit the fixed gear to become a movable gear so that the platform may descend without operation of the motor.

4. A detached and independently movable frame, a platform supported in and guided by said frame and upon which paper may be piled, an electric motor carried on said frame, connections from the motor to the platform for raising the latter, electrical devices automatically controlled by the height of the pile of paper for starting and stopping the motor, adjustable devices for offsetting the top of the pile of paper any desired amount, and an anti-friction roller between the top of the pile of paper and the electrical device.

5. In a detached and independently movable device of the character described, the combination with a frame, a platform upon which paper is to be piled, a motor carried by the frame, connections from the motor to the platform for raising it, and automatically operating means for controlling the operation of the motor by the height of the pile of paper on the platform, of a shaft and wheels for offsetting the top of the pile of paper, connections for driving said shaft from an intermediate point in the connections between the motor and the platform, and means by which said shaft may be shifted so as to vary the amount of offset given to the top of the pile of paper.

6. The combination with a frame work, a platform guided thereby and upon which paper may be piled, and a motor, of an automatically closing circuit closer supported on said frame above the pile of paper to be lifted and adapted to be opened when contacted by the top of the pile of paper when lifted, electrical devices associated with the circuit closer for starting and stopping the motor, and a nest of planetary gearing and connections between the motor and the platform for lifting the same, said planetary gearing automatically serving to prevent the downward movement of the platform.

7. The combination with a platform a motor and connections for raising said platform, and a planetary gearing having central gears of different sizes in the connections between the motor and the platform, of a brake associated with the smaller of the central gears in the planetary gearing, said brake being arranged to either hold such smaller gear in a fixed position or to permit it to slip in lowering the platform.

8. The combination with a platform, a motor and connections for raising said platform, and a planetary gearing having central gears of different sizes in the connections between the motor and the platform, of means by which one of the central gears in the planetary gearing is held in a fixed position during the elevating process and is released to permit the platform to descend, and a brake for controlling the rate at which the platform descends.

Signed at Chicago, Ill. this 13th day of Feb. 1909.

CLARENCE E. STEERE.

Witnesses:
 C. L. REDFIELD,
 NELSON DE LONG.